W. H. NOELTING.
CASTER.
APPLICATION FILED JULY 6, 1920.
1,383,557.
Patented July 5, 1921.
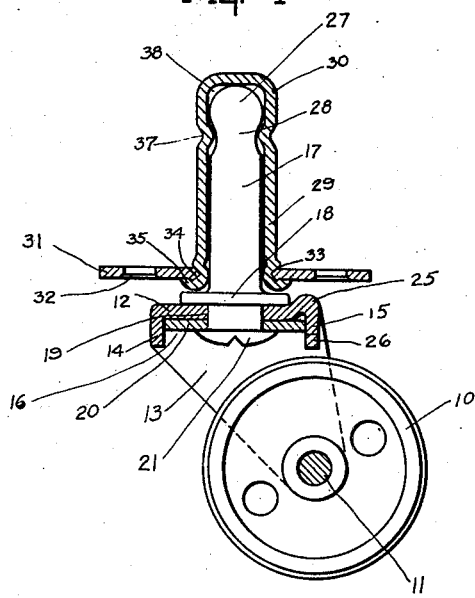
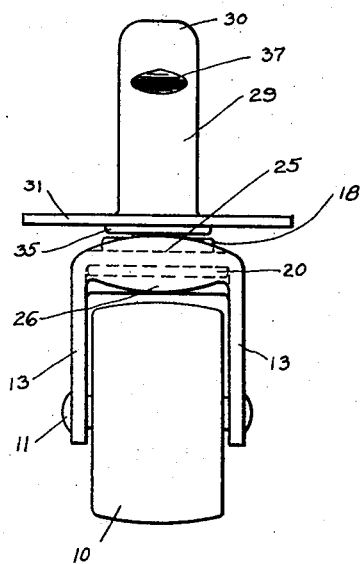
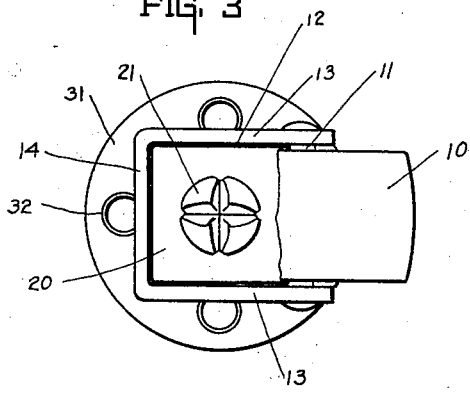
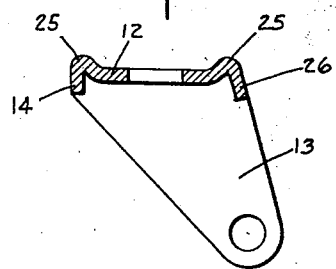
William H. Noelting
INVENTOR.
BY
Lockwood & Lockwood
ATTORNEYS.

UNITED STATES PATENT OFFICE.

WILLIAM H. NOELTING, OF EVANSVILLE, INDIANA.

CASTER.

1,383,557.   Specification of Letters Patent.   Patented July 5, 1921.

Application filed July 6, 1920. Serial No. 394,256.

*To all whom it may concern:*

Be it known that I, WILLIAM H. NOELTING, a citizen of the United States, and a resident of Evansville, county of Vanderburg, and State of Indiana, have invented a certain new and useful Caster; and I do hereby declare that the following is a full, clear, and exact description thereof, reference being had to the accompanying drawings, in which like numerals refer to like parts.

This invention relates to a caster for heavy objects such as pianos, refrigerators and like furniture.

The chief object of the invention is to provide a caster for heavy furniture which is constructed of but few parts which are designed and formed and so positioned that the same coöperate to support the load.

The chief feature of the invention consists in forming the yoke so that the upper portion thereof is reinforced in an improved manner and the apron thereof shaped so as to resist strain.

Another feature of the invention consists in providing a lubricating chamber in the stem head receiving portion of the socket.

A further feature of the invention consists in providing non-circular washer means associated with the non-circular receiving yoke for securing the caster stem to the caster yoke which greatly reinforces the same.

The full nature of this invention will be understood from the accompanying drawings and the following description and claims.

Figure 1 is a central sectional view of a caster embodying the features of my invention. Fig. 2 is a front elevational view of the same showing two features of the invention in detail. Fig. 3 is a bottom plan view of the invention showing a third feature of the invention in detail. Fig. 4 is a side elevational view of a modified form of the invention.

In the drawings 10 indicates the usual caster roller rotatably supported upon the axle or shaft 11, which in the present instance comprises a rivet. The rivet 11 is rotatably supported by a yoke 12 from which there extends downwardly a pair of ears 13, on the lower end of which is supported the shaft or axle 11. The body portion 12 is preferably formed non-circular and in the present instance is shown rectangular or substantially square in outline. Depending from the sides of the yoke between the substantially parallel and depending ear portions are flanged portions 14 and 15, 14 indicating the rear flange and 15 the front or forward flange. Thus the flanges 14 and 15 are positioned upon the yoke 12 with respect to the ears 13 to provide a substantially rectangular chamber or recess 16.

The caster stem 17 is substantially cylindrical in form and near its lower end is provided with a bearing plate or flange portion 18, against which the yoke body portion 12 is adapted to bear. The stem 17 extends through a central opening 19 in the yoke portion, and upon the other end is positioned the washer 20, said washer being secured to said chamber by means of the free end portion 21 formed by upsetting or welding or otherwise enlarging the other end of the stem 17. The washer 20 is shown clearly in Fig. 3 as substantially rectangular in form and corresponds to the rectangular chamber or recess 20 into which it is received. Thus the washer is non-rotatably positioned within the yoke and adjacent the same. The bearing surface between the yoke 12 and the washer 14 is thus increased and provides additional bearing surface therebetween. Thus the caster stem and the yoke are secured together non-rotatably.

As shown clearly in Fig. 1 the axis of the caster stem 17 and the axis of the roller supporting shaft 11 are at right angles to each other and lie in different parallel planes. Thus the strain upon the caster is transmitted therethrough intermediate said planes by the yoke portion. To insure that the yoke portion shall be of sufficient strength to carry the loads imposed upon the same, said yoke portion at the forward portion thereof and intermediate the planes including the stem and roller shaft axes, is bent upwardly to form a bead 25, said bead portion as shown clearly in Fig. 2 being curved upwardly toward the middle of the caster. To further increase the load capacity of the caster yoke the bead portion 25 is drawn downwardly to form the chamber forming wall 15 hereinbefore described. And as shown clearly in Fig. 2 said chamber forming wall 15 is curved concavely and downwardly at the middle of the caster to form a curved apron portion 26. In the present invention the reinforcing bead and reinforcing curved apron are substantially in super-posed relation and are positioned intermediate the parallel planes including the stem axis and the roller shaft axis.

While the upwardly extending bead 25 and the downwardly extending and curved apron 26 are shown in Fig. 1 positioned upon the front portion of the yoke 12, it will be understood that the same may be positioned upon the rearward portion in addition thereto, as shown in Fig. 4. When the roller shaft axis and the stem axis bear the relation to each other as indicated in Fig. 1, such reinforcing members preferably are positioned upon the front portion only except in exceptional cases when the same may be formed upon both front and rear portion of the caster yoke, as shown in Fig. 4.

This construction heretofore described reinforces the yoke portion so that the crushing effect of the load upon the caster or metal of the forward portion of the yoke is provided for by the reinforcement.

The upper portion of the caster stem 17 is suitably rounded to provide a ball or head portion 27 and reduced to form a neck portion 28 between the longitudinal body portion and the rounded head portion. The socket associated with the caster hereinbefore described comprises a cylindrical body portion 29 having a rounded end 30 against which the rounded head portion 27 of the caster stem bears when the head is placed upon the caster. A circular flange plate or track plate 31 is provided with bolt or screw receiving openings 32, by which the plate may be secured to the leg of a piano or other articles of furniture. The track plate 31 is positioned upon the socket 29 by the same having a bead portion 33 swaged adjacent thereto. The socket portion 29 extends through an opening 34 in the track plate 31, and the other end of said socket is turned outwardly or upset to form a securing flange portion 35 by which the socket is secured to the track plate, and in turn to the furniture leg.

As shown clearly in Figs. 1 and 2, the socket 29 is provided with suitable notches 37 which are positioned such that the socket receiving portion forming the same extends inwardly and engages the reduced neck portion 28 of the caster stem. If desired this construction may be extended so that an inwardly extending neck engaging collar would be formed in the socket. The notches 37 form a chamber 38 adapted to receive the ball or rounded head portion 27 of the caster stem, and said chamber is further adapted to receive a heavy lubricant such as vaseline or the like.

The invention claimed is:

1. A caster including a roller and a yoke, including a pair of ears rotatably supporting said roller, said yoke including an upwardly extending bead portion intermediate the ear portions and extending transversely thereof.

2. A caster including a stem, a roller and a yoke, including a pair of ears rotatably supporting a roller, said yoke including an upwardly extending bead portion, and a downwardly extending apron portion positioned between said ears and independently thereof, said bead portion extending transversely of said ears.

3. A caster including a roller, and a substantially rectangular yoke, including a depending pair of ears rotatably supporting said roller, said yoke including a downwardly extending apron positioned between said ear portions and integral therewith and the yoke portion for reinforcing the latter, said apron being of arch formation with the greatest cross section intermediate its ends.

4. A caster construction, including in combination a caster stem, a roller, a substantially rectangular yoke including a pair of ears depending from opposite sides of said rectangular yoke and rotatably supporting the roller, means depending from the other sides of said rectangular yoke intermediate the ears of the yoke to form a rectangular chamber, a rectangular washer nested in said chamber and substantially filling the same for securing the stem to said yoke, said washer lying against said yoke to reinforce the same, and a bead portion upon the upper face of said yoke and extending transversely of the ears for reinforcing said yoke.

5. A caster construction, including in combination a caster stem, a roller, a substantially rectangular yoke including a pair of ears depending from opposite sides of said rectangular yoke and rotatably supporting the roller, means depending from the other sides of said rectangular yoke intermediate the ears of the yoke to form a rectangular chamber, said means being integral with the ears and with the yoke to reinforce the yoke, a rectangular washer nested in said chamber and substantially filling the same for securing the stem to said yoke, said washer lying against said yoke to reinforce the same, and a bead portion upon the upper face of said yoke and extending transversely of the ears for reinforcing said yoke.

In witness whereof, I have hereunto affixed my signature.

WILLIAM H. NOELTING.